United States Patent [19]
Gold

[11] 4,078,378
[45] Mar. 14, 1978

[54] AUTOMOTIVE GAS TURBINE FUEL CONTROL

[75] Inventor: Harold Gold, Shaker Heights, Ohio

[73] Assignee: The United States of America as represented by the Administrator of the National Aeronautics and Space Administration, Washington, D.C.

[21] Appl. No.: 739,909

[22] Filed: Nov. 8, 1976

[51] Int. Cl.² .................................................. F02C 9/04
[52] U.S. Cl. ............................................. 60/39.28 R
[58] Field of Search ..................... 60/39.28 R, 39.28 T

[56] References Cited

U.S. PATENT DOCUMENTS

| | | | |
|---|---|---|---|
| 2,865,166 | 12/1958 | Holbrook | 60/39.28 R |
| 3,062,007 | 11/1962 | Szydlowski | 60/39.28 R |
| 3,713,290 | 1/1973 | Gold | 60/39.28 R |

*Primary Examiner*—Robert E. Garrett
*Attorney, Agent, or Firm*—Norman T. Musial; John R. Manning; James A. Mackin

[57] ABSTRACT

There is disclosed herein a fuel control useful for automotive-type gas turbines and particularly advanced gas turbines utilizing variable geometry components to improve mileage and reduce pollution emission. The fuel control described compensates for fuel density variations, inlet temperature variations, turbine vane actuation, acceleration, and turbine braking. These parameters are utilized to control various orifices, spool valves and pistons in a desired manner.

14 Claims, 8 Drawing Figures

AUTOMOTIVE GAS TURBINE FUEL CONTROL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to improvements in the gas turbine engine fuel control that is described in my earlier U.S. Pat. No. 3,713,290. This previous device was invented to meet the requirements of a class of fixed geometry aircraft gas turbine engines. The acceleration law required a linear, altitude independent function of engine pressure ratio and, there was no requirement for corrected speed limiting.

The fuel control of the present invention meets the requirements of current automotive gas turbine engines and accordingly the improvements made extend the functional capability of the earlier system to include the following:
1. Nonlinear function of engine compression ratio acceleration law limit control;
2. Corrected speed signal generation;
3. Corrected speed limiting;
4. Corrected speed actuation of variable engine geometry;
5. Deceleration cut-off; and
6. Power turbine vane reversal for engine braking.

OBJECTS OF THE INVENTION

In accordance with the foregoing, it is a primary object of the invention to provide an improvement of the pump circuit of U.S. Pat. No. 3,713,290 to obtain a corrected speed signal.

It is a further object to provide an improvement of the earlier metering circuit to follow a non-linear, altitude independent function of engine pressure ratio.

It is yet another object of the invention to provide means for corrected speed limiting.

It is a further object to provide a corrected speed servomotor output having acceleration lead compensation.

Still another object of the invention is to provide means for corrected speed servomotor driven turbine vane reversal during vehicle braking.

It is an additional object of this invention to provide a mechanical speed sensor that is responsive to speed for starting enrichment and to engine inlet air temperature for corrected speed limiting and is responsive to external adjustment for dimensional and fuel density compensation.

These and other objects and features of the invention will be fully explained in the detailed description of the invention.

SUMMARY OF THE INVENTION

In summary, the fuel control of this invention utilizes a hydraulic mechanism for controlling the flow of fuel to an automotive gas turbine engine and for automatically adjusting engine components such as turbine nozzle vane angles during various operational modes. The system provides: metered flow during acceleration in accordance with a non-linear, altitude independent function of pressure ratio; fuel delivery during deceleration that is either complete cut-off or a low altitude dependent value; a corrected speed servomotor output with acceleration lead; automatic limiting of maximum corrected speed; and full range speed governing.

As in U.S. Pat. No. 3,713,290, the metering and governing systems derive their response to engine mechanical speed from the flow from a positive displacement pump that rotates at a speed proportional to engine mechanical speed; and the pressure gradient across the pump is maintained at substantially zero by a pressure regulator to prevent slip and to accomplish the metering function. In the system of this invention, the flow from the positive displacement pump is utilized to obtain a corrected speed signal in addition to the mechanical speed signal that was obtained with the system of my earlier patent.

BRIEF DESCRIPTION OF THE DRAWINGS

The principles of structure and methods taught by the invention are disclosed in the following specifications and claims which is taken in conjunction with the accompanying drawings, in which:

DESCRIPTION OF THE PREFERRED EMBODIMENT

Figure 1:
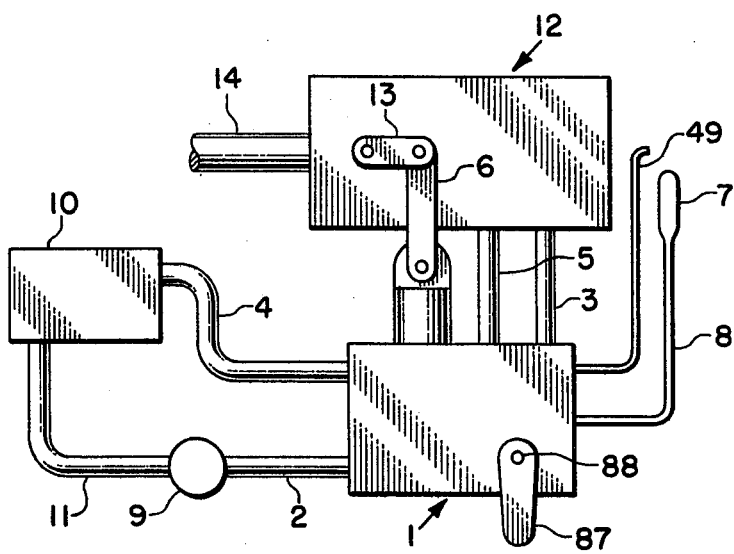
FIG. 1 is a schematic drawing showing the interrelation of the fuel control, engine, and fuel reservoir.

In the schematic drawing of FIG. 1, fuel control body 1 is connected to the following: inlet conduit 2, discharge conduit 3, return conduit 4, engine driven shaft 5, servomotor out put link 6, compressor inlet temperature sensor 7 through sensor line 8; and compressor inlet pressure tube 49. Supply pump 9 draws fuel from reservoir 10 through conduit 11 and passes the fuel at elevated pressure into conduit 2. Shaft 5 is driven from the gas generator shaft (not shown) of engine 12. Fuel flowing from discharge conduit 3 passes into the fuel injection system (not shown) of engine 12 and excess flow from pump 9 passes into reservoir 10 through return conduit 4. Servomotor output link 6 connects to control arm 13 of the power turbine vane (not shown) of engine 12. Shaft 14 connects the power turbine (not shown) of engine 12 to the vehicle transmission (not shown). Gas generator speed selection is through power control lever 87 which is coupled to power control spindle 88 in fuel control body 1.

Figure 2:
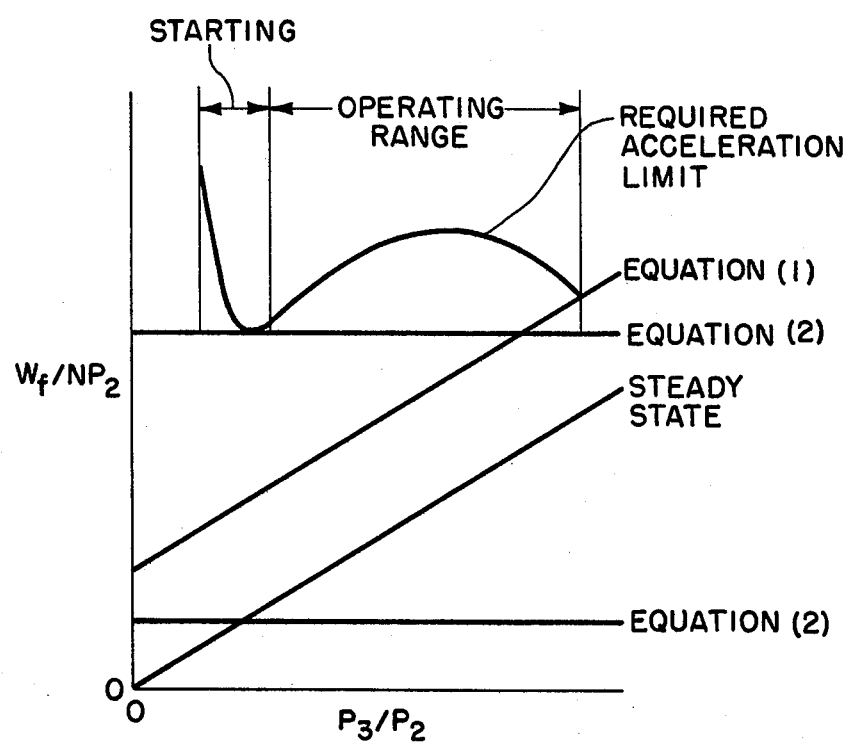
FIG. 2 is a graphic presentation showing the general characteristic of the non-linear, altitude-independent function of pressure ratio required in acceleration metering to automotive gas turbine engines.

The altitude independent relationships describing acceleration and deceleration limits that are employed in the invention are:

$$(W_f/NP_2) = K_2 + K_3 (P_2/P_3) \quad (1)$$

and $$(W_f/NP_2) = K_4 \quad (2)$$

where:
$W_f$ — Weight flow rate of fuel to engine
$P_2$ — Compressor inlet total pressure
$P_3$ — Compressor discharge total pressure
$K_2$ — Constant
$K_3$ — Constant
$K_4$ — Constant
$N$ — Rotational speed of engine gas generator FIG. 2, which presents equations (1) and (2) graphically illustrates typical relative magnitudes of the parameters and the steady state characteristic of the engine. The relationships given by equations (1) and (2) are termed linear because they plot as straight lines on the coordinate used in FIG. 2, equation (1) having a positive slope and equation (2) having a slope of zero. As shown in FIG. 2, neither linear limit provides a close match to the nonlinear limit that is characteristic of the automotive gas turbine engine. The relationship of equation (2) is employed in the invention rather than the relation of equation (1) because, as will be shown, the relationship of equation (2) is more readily augmented to match the nonlinear requirement and requires sensing of one rather than two pressures.

A corrected speed signal is required to meet the power turbine vane positioning requirement. This signal is not available in the fuel control of U.S. Pat. No. 3,713,290. Accordingly the present invention employs a circuit that is a modification of the one used in the earlier invention. The modified hydromechanical circuit is drawn in FIG. 3.

Figure 3:
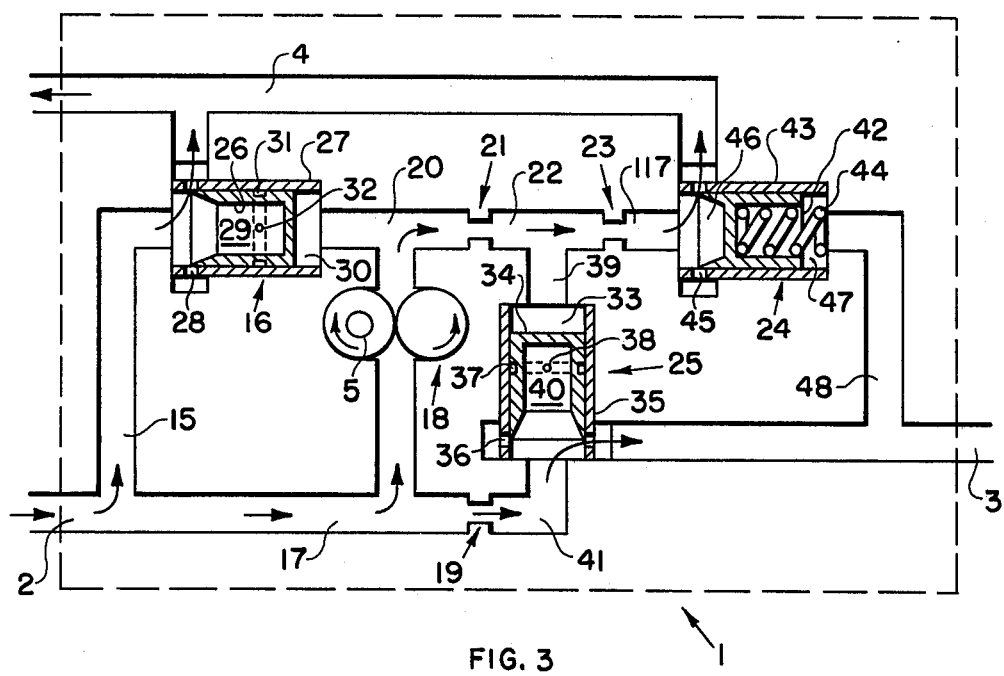
FIG. 3 is a schematic drawing of the hydraulic speed sensing and multiplying circuit employed in this invention; and, FIG. 4 is a schematic drawing of the variable orifice system that controls the flow of fuel to the engine; and, FIG. 5 is a graphic presentation showing the general character of one of the variable orifices illustrated in FIG. 4; and, FIG. 6 schematically illustrates a configuration of flow restrictions that is utilized to provide: starting enrichment, corrected speed signal generation, corrected speed limiting, and external means for flow delivery adjustment; and, FIG. 7 is an opposite side view of a lever arm shown in FIG. 6; and, FIG. 8 is a schematic drawing of the corrected speed servomotor showing the relationship with the mechanical speed governor to obtain acceleration lead, and means for obtaining power turbine vane reversal.

In the FIG. 3 circuit, fuel is delivered to inlet conduit 2 from a pump such as pump 9 shown in FIG. 1. The components and passages of this configuration are housed in control body 1 as indicated by the dashed line rectangle. The flow paths in the circuit are indicated by arrows and are as follows. Excess flow from pump 9 flows in conduit 15 to pressure regulator 16, from which the excess flow passes into return conduit 4. Conduit 2 joins conduit 17 from which the flow divides into two paths, one being through positive displacement pump 18 and the other through flow restriction 19. Pump 18 is driven by shaft 5 at a rotational speed that is proportional to the rotational speed of the engine gas generator. Flow from pump 18 passes into conduit 20, through mechanical speed sensing flow restriction 21 into conduit 22, through corrected speed sensing flow restriction 23 to pressure regulator 24 and from regulator 24 to return conduit 4. Flow passing through flow restriction 19 passes through pressure regulator 25 and into discharge conduit 3.

Pressure regulator 16 comprises free piston 26 and mating sleeve 27. Piston 26 moves axially to form a variable orifice by blocking a portion of the area of holes 28 in sleeve 27. Flow from conduit 15 passes into chamber 29 of regulator 16 from which it passes through holes 28 into return conduit 4. Chamber 30 of regulator 16 opens into conduit 20. Piston 26, responding to the force resulting from the pressures in chambers 29 and 30 throttles the flow through holes 28 to hold the pressure in chamber 29 equal to the pressure in chamber 30 and thereby hold the pressure gradient across pump 18 at substantially zero. Annulus 31 in piston 26 communicates with chamber 29 through hole 32, thereby holding the pressure in annulus 31 equal to the pressure in chamber 29. This pressure equalization prevents flow from chamber 30 to holes 28 through the piston to sleeve clearance. Because of the substantially zero pressure gradient across pump 18 and the prevention of flow from chamber 30, the volumetric flow rate through restriction 21 is substantially equal to the displacement rate of pump 18.

The flow passing through restriction 21 is carried by conduit 22 to chamber 33 of pressure regulator 25. Regulator 25 which is identical in configuration to regulator 16 and performs in an identical way comprises piston 34 and sleeve 35, sleeve 35 having holes 36, and piston 34 having annulus 37 and hole 38. Chamber 33 of regulator 25 opens into conduit 22 through conduit 39 and chamber 40 of regulator 25 connects to conduit 41. Accordingly regulator 25 holds the pressure in chamber 40 equal to the pressure in chamber 33 and thereby holds the pressure downstream of restriction 19 substantially equal to the pressure downstream of restriction 21. As described previously, the pressure upstream of restriction 19 is held substantially equal to the pressure upstream of restriction 21 by regulator 16. Because of the upstream and downstream pressure equalities, the pressure drop across restriction 19 is made equal to the pressure drop across restriction 21. As in the case of regulator 16, flow from chamber 33 to holes 36 through the clearance between piston 34 and sleeve 35 is prevented by the pressure equality between annulus 37 and chamber 33, therefore the volumetric flow through restriction 23 is substantially equal to the displacement rate of pump 18. In the circuit employed in U.S. Pat. No. 3,713,290, the pressure equality downstream of the restrictions equivalent to restrictions 21 and 19 is obtained by joining the two flow paths. The joining of the flow paths prohibits the utilization of the flow from pump 18 for corrected speed signal generation as is utilized in the present invention.

Pressure regulator 24 comprises piston 42, mating sleeve 43 and bias spring 44. Piston 42 moves axially to form a variable orifice by blocking a portion of the area of holes 45 in sleeve 43. Flow from restriction 23 passes into chamber 46 of regulator 24 and through holes 45 to return conduit 4. Chamber 47 of regulator 24 communicates with discharge conduit 3 through conduit 48. Piston 42, responding to the forces resulting from the pressures in chambers 46 and 47 and the force applied by spring 44, throttles the flow through holes 45 to hold the pressure in chamber 46 at a substantially constant value above the pressure in conduit 3. The force applied by spring 44 on piston 42 can be set to maintain a functional pressure drop across regulators 16 and 25 at all operating conditions. No other minimum pressure-level setting regulator is required by the engine-fuel control system.

As described above, the flow that is delivered to the engine through conduit 3 is the flow that passes through restriction 19; and, the pressure drop across restriction 19 is equal to the pressure drop across restriction 21. The pressure drop across restriction 21 is generated by the flow driven through it by pump 18 and can be expressed as:

$$\Delta P_R = (\rho D^2 N^2 / K^2 A_R^2) \quad (3)$$

Where:
$\Delta P_R$ — Pressure drop across restriction 21
$\rho$ — Fuel density
$D$ — Volume displaced by pump 18 per revolution of engine gas generator
$N$ — Rotational speed of engine gas generator
$A_R$ — Effective orifice area of restriction 21
$K$ — Dimensional constant The weight flow rate throug restriction 19 is $$W_f = KA_B\sqrt{\rho\Delta P_R} \qquad (4)$$

where:
$W_f$ — Weight flow rate
$A_B$ — Effective orifice area of restriction 19 substituting equation (3) in equation (4) gives $$W_f = (A_B DN/A_R) \qquad (5)$$

Equation (2) can be written $$W_f = K_4 P_2 N \qquad (6)$$

It can be seen from equations (5) and (6) that the system will deliver fuel in accordance with equation (6) provided that it is constructed so that $$A_B = (K_4 A_R P_2 / D) \qquad (7)$$

As shown by equation (7) fuel will be delivered according to the zero slope acceleration limit shown in FIG. 2 provided the effective orifice area of flow restriction 19 is made to vary linearly with compressor inlet pressure as defined by equation (7).

To meet the nonlinear acceleration limit shown in FIG. 2, this invention provides a flow restriction 19 comprising an orifice the area of which varies linearly with compressor inlet pressure and a parallel orifice that varies nonlinearly with the rotational speed of the engine gas generator (hereinafter referred to as engine speed). The orifice array of this invention that forms restriction 19 includes the above said parallel pair and other variable orifices that are employed to meet other requirements. The full orifice array is shown schematically in FIG. 4. The orifice array forming restriction 19 is housed in body 1 and as shown in FIG. 4, comprises: engine air inlet pressure responsive orifice assembly 50, engine speed responsive orifice assembly 51, and governor orifice assembly 52.

Orifice assembly 50 comprises spool 53, sleeve 54, aneroid bellows 55 and input bellows 56. Spool 53 has lands 57, 58, and 59. Land 59 coacts with port 60 in sleeve 54 and land 58 coacts with port 61 to form variable orifices 62 and 63, respectively. Ports 60 and 61 have constant lateral dimensions and thereby the areas of orifice 62 and 63 vary linearly with axial movement of spool 53. Bellows 56 is fastened to wall 181 of chamber 182 and to the end of land 57 of spool 53. Similarly, bellows 55 is fastened to wall 183 of chamber 184 and to the end of land 59 of spool 53. Chambers 182 and 184 communicate, through conduits 185 and 186, respectively, with conduit 4 (shown in FIG. 3). Compressor inlet pressure communicates with bellows 56 through tube 49, and accordingly spool 53 is displaced axially under the linear spring restraint of bellows 55 and 56 so that the area of orifices 62 and 63 increase linearly with increase in compressor inlet pressure. Flow from conduit 17 is transmitted to orifice 63 through conduit 64 and hole 65 in sleeve 54; and, flow from conduit 17 is transmitted to orifice 62 through conduit 66 and hole 67 in sleeve 54. Orifice 63 discharges into conduit 68 and orifice 62 discharges into conduit 69.

Orifice assembly 51 comprises spool 70 (shown in partial cross-section) sleeve 71 and springs 72 and 73. Spool 70 has lands 74 and 75 which coact with port 76 in sleeve 71 to form variable orifice 77. Spring 72 is compressed between the end of land 74 and the end wall of chamber 78; and spring 73 is compressed between the end of land 75 and the end wall of chamber 79. Chamber 78 communicates with conduit 41 through conduits 80, 68 and 101; and, chamber 79 communicates with conduit 17 through conduit 81. The pressure difference acting axially on spool 70 is thereby the pressure drop across restriction 19; and through the action of pressure regulators 16 and 25 this pressure drop is equal to the pressure drop across restriction 21. Thereby, the pressure difference acting axially on spool 70 is, as given by equation (3), proportional to the square of engine speed. This pressure difference, acting against the restraint of springs 72 and 73, moves spool 70 axially in sleeve 71 with changing engine speed. Hole 82 in spool 70 transmits flow from conduit 81 to the annular space between lands 74 and 75.

Figure 5:
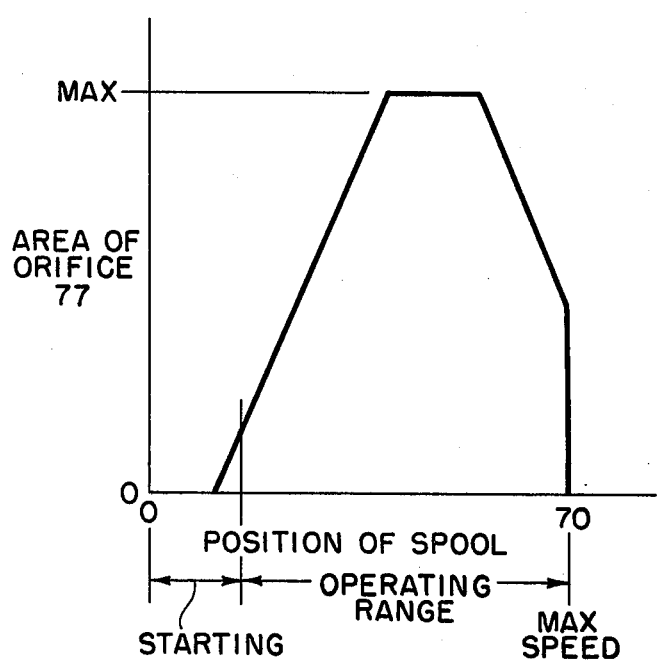
Figure 4:
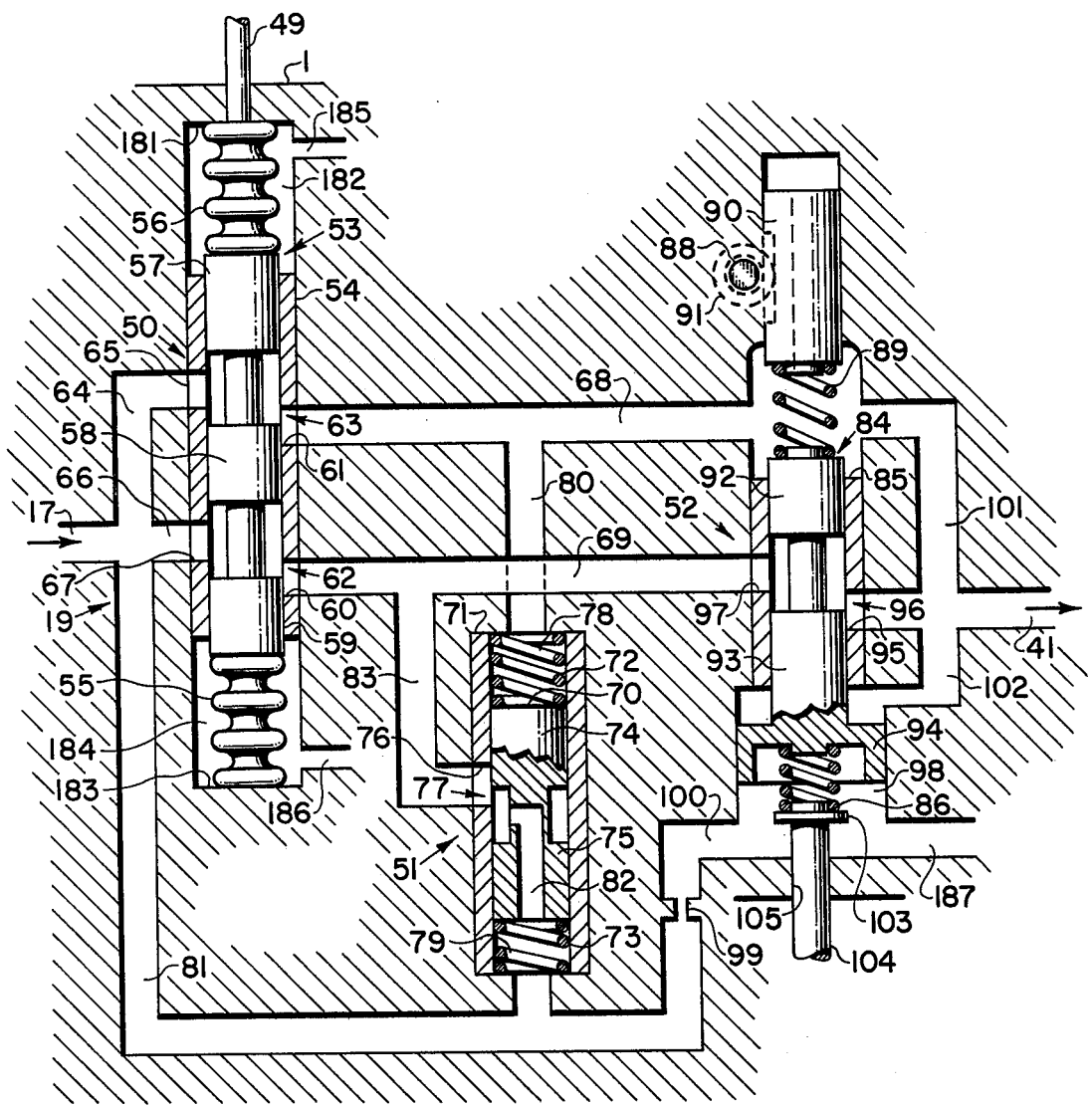

In FIG. 4, the position of spool 70 that is shown is representative of a low engine speed. With increasing engine speed the pressure difference drives the spool upward from the position that is shown in FIG. 4. I find from engine data that with spool 70 being axially positioned in proportion to the source of engine speed, that the required variation of the area of orifice 77 with axial position of spool 70 is characteristically as shown graphically in FIG. 5. There are three linear regions in the characteristic shown in FIG. 5, there being a positive slope in the low engine speed range, a negative but equal slope in the high speed range and a zero slope in the mid speed range. This characteristic can be provided by the orifice assembly 51 illustrated in FIG. 4 wherein port 76 is axially of constant width and wherein the axial distance between lands 74 and 75 is greater than the axial length of port 76.

With this assembly the area of orifice 77 increases with speed as the annular edge of land 74 moves upward with speed (in the low speed range), the area remains constant with speed starting from the speed at which the annular edge of land 74 passes the upper edge of port 76 and until the annular edge of land 75 reaches the lower edge of port 76. Land 75 moves over port 76 with further upward travel of spool 70, thereby reducing the area of orifice 76 with increasing speed (in the high speed range). Flow from variable orifice 77 is transmitted to conduit 69 through conduit 83.

Orifice assembly 52, illustrated in FIG. 4, comprises: spool 84, mating sleeve 85, bias spring 86, loading spring 89, rack piston 90, pinion 91 and power control spindle 88. Spool 84 has lands 92 and 93 and head 94. Land 93 coacts with port 95 in sleeve 85 to form variable orifice 96. Flow from variable orifices 62 and 77 is transmitted to variable orifice 96 through conduit 69 and opening 97 in sleeve 85. Head 94 operates as a piston in chamber 98. Head 94 communicates at its outer face with conduit 17 through conduit 81, damping orifice 99 and conduit 100. The outer end of land 92 communicates with conduit 41 through conduit 101 and the annular face of head 94 communicates with conduit 41 through conduit 102. Loading spring 89 acts between rack piston 90 and the outer end of land 92, and bias spring 86 acts between spring head 103 and the outer end of head 94. Spring head 103 is held in place by rod 104. Rod 104 is held slidably in bore 105 in body 1, through which, as will be explained, orifice assembly 52 is made to interact with the corrected speed servomotor.

Through the communication with conduits 17 and 41, the pressure differential that acts on the ends of governor spool 84 is proportional to the square of engine speed. The equilibrium, axial position of spool 84 in sleeve 85 is determined by the balance of spring and pressure differential induced forces that act on spool 84. At an equilibrium position, the area of orifice 96 is much smaller than the areas of orifices 62, 63 and 77 and, accordingly, the rate of fuel flow to the engine is determined principally by orifice 96. Upon an increase in engine speed, at fixed position of spindle 88, the increase in the pressure differential acting on spool 84 moves spool 84 in the upward direction in FIG. 4 to reduce the area of orifice 96 and thereby to reduce the rate of fuel flow to the engine.

Sudden incremental rotation of spindle 88 to drive rack piston 90 in the downward direction in FIG. 4 increases the force applied to spool 84 by loading spring 89 and thereby drives spool 84 in the downward direction to increase the area of orifice 96. The increase in fuel flow rate to the engine that results from the increase in the area of orifice 96 is limited by orifices 62, 63 and 77 in accordance with flow regulating action of these orifices previously described. The increasing engine speed that results from the increased fuel flow rate causes the pressure differential acting on spool 84 to increase, thereby driving spool 84 upward to reduce the area or orifice 96. This area reduction continues until a new equilibrium position of spool 84 is reached, at which point the engine is at a new equilibrium speed.

Sudden incremental rotation of spindle 88 to drive rack piston 90 in the upward direction in FIG. 4 decreases the force applied to spool 84 by loading spring 89, the resulting force unbalance driving spool 84 in the upward direction in FIG. 4 to reduce the area of orifice 96 to a lower value or to zero. When the area of orifice 96 is driven to zero, flow from orifices 62 and 77 are blocked and the flow to the engine is controlled by orifices 63 alone. In this mode, the deceleration limit is in accordance with the lower equation (2) limit identified in FIG. 2. If complete shut-off under deceleration is required, orifice assembly 50 is reduced to a two land spool configuration in which orifice 63 is eliminated.

Figure 6:
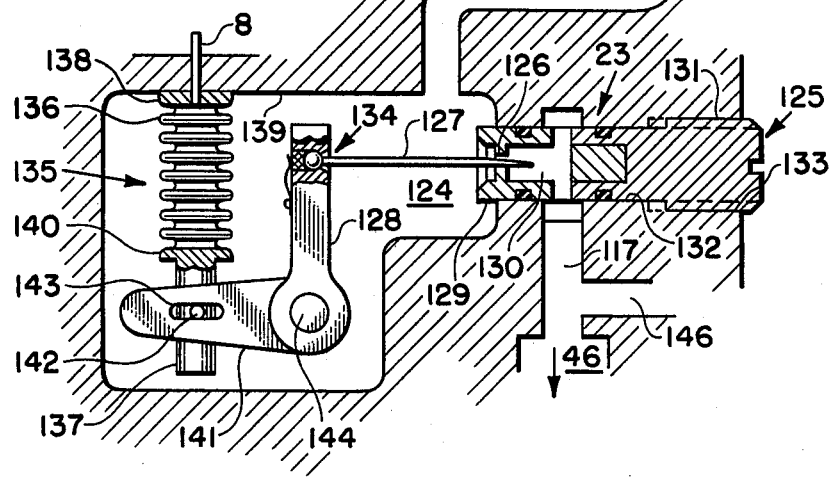

The functional requirements of the mechanical speed sensing flow restriction 21 and corrected speed sensing flow restriction 23 are provided by the mechanism illustrated in FIG. 6. As shown in FIG. 6, mechanical speed sensing flow restriction 21 comprises: carrier 106, piston 107, spring 108, metering rod 109 and temperature actuator arm 110. Carrier 106 has coaxial cylindrical sections 111 and 112 and external threads 113. Cylindrical sections 111 and 112 mate with bore 115 and threads 113 mate with internal threads 114 in body 1. Piston 107 mates slidably with bore 116 in carrier 106. Spring 108 engages the head of piston 107 and end wall 118 of bore 116. Snap ring 119 retains piston 107 in bore 116. Orifice 120 in the head of piston 107, bore 116 and section 111 are concentric. Metering rod 109 lies in orifice 120 and is fastened to temperature actuator arm 110 by ball joint 121, and is held substantially concentric with orifice 120 thereby. Passage 122 in carrier 106 connects bore 116 to annulus 123 in bore 115. Conduit 22 connects annulus 123 to chamber 124 of flow restriction 23.

Flow from pump 18 is conducted by conduit 20 into chamber 125 of flow restriction 21, from which the flow passes through orifice 120, passage 122 and conduit 22 to chamber 124 of flow restriction 23.

At the initiation of cranking of the engine, piston 107 is held at the limit of advance toward metering rod 109 by spring 108 and snap ring 119 (as drawn in FIG. 6). The increase in the rotational speed of pump 18 which follows engine ignition produces an increase in the pressure drop across orifice 120 which moves piston 107 away from metering rod 109. The metering rod 109 is contoured so that the free area between orifice 120 and rod 109 increases as piston 107 moves away from rod 109. The smaller effective orifice area of restriction 21 that is produced in the starting speed range by the interaction of piston 107 and metering rod 109 provides the starting speed range enrichment that is specified by the nonlinear acceleration limit shown in FIG. 2. The enriching effect of reduction of effective orifice area of restriction 21 is defined by equation (5). At the upper limit of the starting speed range, piston 107 abuts end wall 118 and remains at that position at all higher engine speeds.

As previously described, the flow rate of the fuel that passes through flow restriction 21 is proportional to mechanical engine speed and this flow rate passes unattenuatedly to flow restriction 23 through conduit 22. Flow restriction 23 comprises: orifice carrier 125, orifice 126, metering rod 127 and temperature actuator arm 128. Carrier 125 has cylindrical section 129, chamber 130 and external threads 131. Cylindrical section 129 mates with bore 132 and threads 131 mate with internal threads 114 in body 1. Orifice 126, cylindrical section 129 and threads 131 are concentric. Metering rod 127 lies in orifice 126 and is fastened to temperature actuator arm 128 by ball joint 134, and is held substantially concentric with orifice 126 thereby. Temperature actuator 135 comprises: oil filled bellows 136, capillary sensor line 8 and output rod 137. As shown in FIG. 1, sensor line 8 connects to compressor inlet air temperature sensor 7. Sensor 7, sensor line 8 and bellows 136 form a common oil chamber. The fixed head 138 of bellows 136 is suitably fastened to wall 139 of chamber 124 and sensor line 8 passes out of body 1 through a fluid tight joint. Output rod 137 is fastened to free head 140 of bellows 136 and engages crank arm 141 through pin 142 and slot 143. Crank arm 141, temperature actuator arm 128 and temperature actuator arm 110 are fastened to shaft 144. Expansion of the oil in sensor 7 with increase in compressor inlet air temperature causes bellows 139 to expand downward in FIG. 6, causing temperature actuator arm 110 and temperature actuator arm 128 to rotate counterclockwise in FIG. 6. The counterclockwise rotation of arm 128 draws metering rod 127 out of orifice 126. Metering rod 127 is so contoured that the free area between orifice 126 and rod 127 increases as rod 127 is withdrawn, the free area being substantially proportional to the square root of compressor air inlet temperature. With the effective orifice area of flow restriction 23 being proportional to the square root of compressor air inlet temperature and the flow rate there through being proportional to the mechanical engine speed it follows that the pressure drop across flow restriction 23 will be proportional to the square of mechanical engine speed divided by compressor air inlet temperature. This ratio is known as the square of corrected engine speed. Flow from orifice 126 passes into chamber 130 from which it is conducted by conduit 117 to chamber 46 of regulator 24. As will be explained, branch conduit 146 transmits the pressure downstream of flow restriction 23 to the corrected speed servomotor (shown in FIG. 8). As shown in FIG. 3, branch conduit 39 transmits the pressure upstream of flow restriction 23 to pressure regulator 25.

Shaft 144 passes from chamber 124 to chamber 125 through a suitable shaft seal (not shown). The counter-clockwise rotation of shaft 144 with increase in compressor air inlet temperature causes metering rod 109 to withdraw from orifice 120. To achieve the corrected speed limiting function the free area between orifice 120 and rod 109 must increase as rod 109 withdraws from orifice 120. This requirement is in concurrence with the requirement for starting range enrichment described previously. The increase in the effective orifice area of flow restriction 21 with increase in compressor air inlet temperature causes a reduction in the pressure drop across flow restriction 21 with increase in compressor air inlet temperature at constant mechanical engine speed. At fixed position of spindle 88 of orifice assembly 52 the reduction in pressure drop across flow restriction 21 causes spool 84 to move downward in FIG. 4 thereby opening orifice 96 and increasing the rate of fuel flow to the engine.

The engine accelerates as a result of the increased fuel flow rate until the force balance on spool 84 is restored. The equilibrium engine speed thereby rises as the compressor inlet air temperature rises. Corrected speed can be held constant by this means through a contour of rod 109 that causes the free area between orifice 120 and rod 109 to be proportional to the square root of compressor air inlet temperature. By selection of the rate of travel of rod 109 with compressor air inlet temperature and the rate of travel of piston 107 with pressure drop across flow restriction 21, the contour requirements of rod 109 for corrected speed limiting and for starting enrichment can be simultaneously met.

Figure 7:
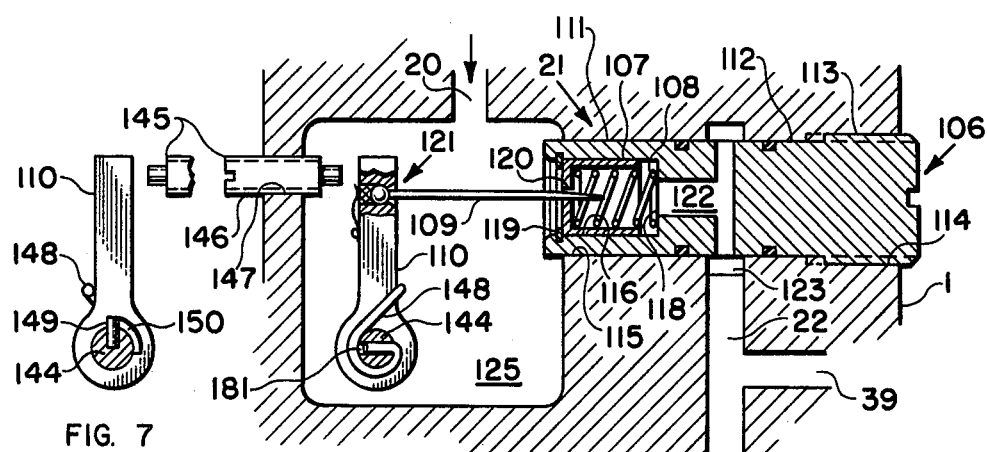

Corrected speed limiting is required only at low compressor air inlet temperatures. Thus above a specific temperature the withdrawal of rod 109 from orifice 120 must cease. This limit is set by stop 145 which projects into chamber 125 and is fastened to body 1 by external thread 146 and mating internal thread 147. Arm 110 is fastened to shaft 144 by torsion spring 148 and, as shown in FIG. 7, by pin 149. Pin 149, which is radially press fitted in shaft 144 is urged toward the position in arcuate slot 150 shown in FIG. 7 by torsion spring 148. Spring 148 engages hole 181 in shaft 144 and the radial lever of arm 110 as shown in FIGS. 6 and 7.

When arm 110 contacts stop 145 under rising compressor inlet air temperature, rotation of arm 110 stops but rotation of shaft 144 and arm 128 continues through movement of pin 149 in slot 150 and winding of spring 148. This action permits temperature actuator 135 to position metering rod 127 in orifice 126 at compressor air inlet temperatures above the maximum temperature of corrected speed limiting.

The screw engagements of orifice carriers 106 and 125 provide the means for tolerance stack-up adjustment and for fuel density adjustment of flow restrictions 21 and 23.

Figure 8:
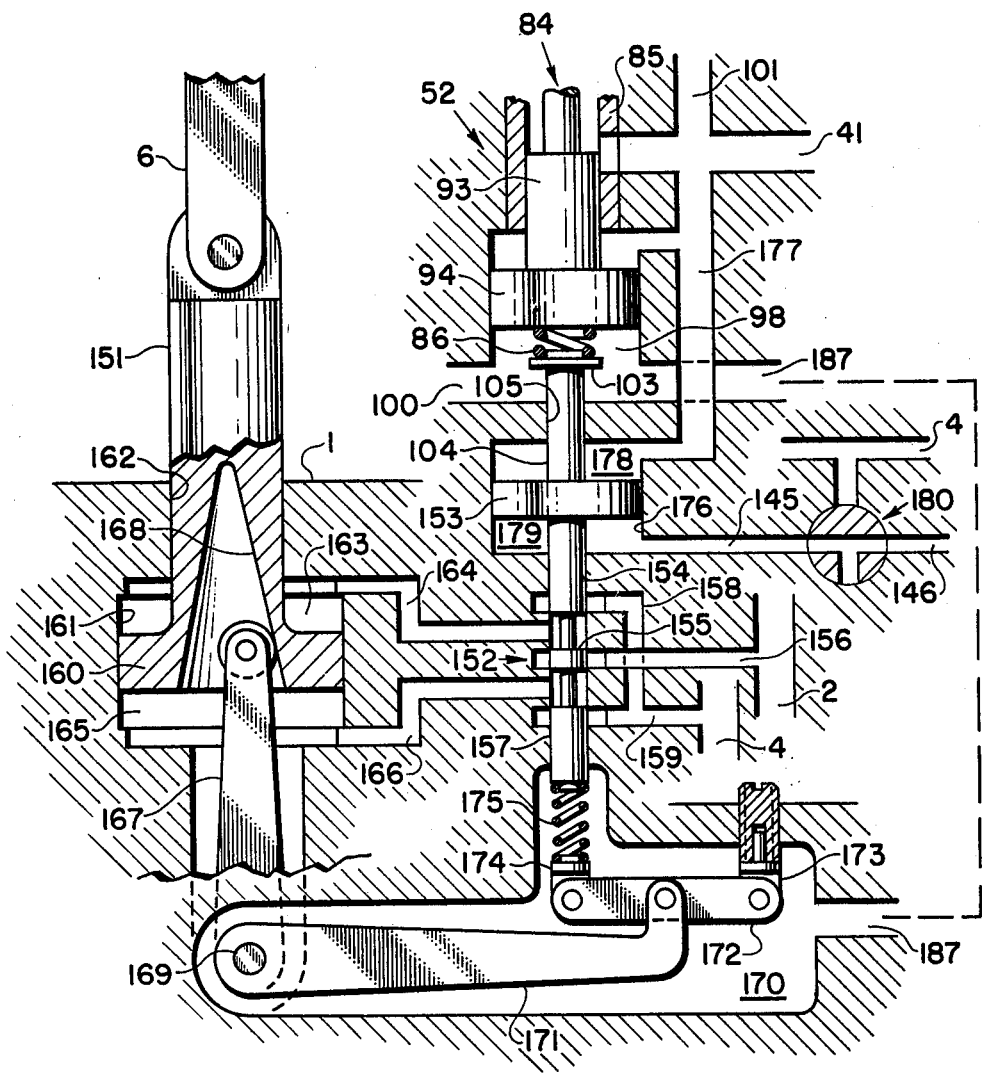

The corrected speed servomotor responds to the pressure drop across corrected speed sensing flow restriction 23 and positions the engine power turbine vane through servomotor output link 6 and control arm 13 (FIG. 1). The corrected speed servomotor, which is shown schematically in FIG. 8, is of the well-known force feedback type. Servomotor output link 6 is pivotally coupled to output shaft 151. The servomotor valve spool 152 is rigidly coupled to corrected speed piston 153 at land 154. Piston 153 is further rigidly coupled to shaft 104 which abuts bias spring 86 through spring cap 103. The diameter of rod 104 is preferably equal to the diameter of spool 152. The center land 155 of spool 152 communicates through conduit 156 with conduit 2, conduit 2 having the highest pressure in the system.

Lands 154 and 157 of spool valve 152 communicate through conduits 158 and 159 with conduit 4, conduit 4 having the lowest pressure of the system. Servomotor piston 160 operates in bore 161. Output shaft 151 is integral with piston 160 and slides out of body 1 through bore 162. Chamber 163 of bore 161 communicates with spool 152 through conduit 164 and chamber 165 of bore 161 communicates with spool 152 through conduit 166. Feed-back arm 167 contacts cam 168 which is integral with piston 160 and arm 167 is fastened to pin 169. Pin 169 is journaled in body 1 (not shown) and passes from chamber 165 to chamber 170 through a suitable seal (not shown). Chamber 170 communicates through conduit 187, in common with chamber 98. Second feedback arm 171, in chamber 170, is fastened to pin 169 and is pivotally coupled to link 172. Link 172 pivots on fulcrum 173 and is pivotally coupled to spring cap 174. Feedback spring 175 is compressed between cap 174 and the end of spool 152 that projects into chamber 170.

A force applied in the downward direction shown in FIG. 8 to valve spool 152 causes a downward movement of spool 152, spool 152 thereby communicating a high pressure source to chamber 163 and communicating a low pressure sink to chamber 165. The resulting downward movement of piston 160 causes a counter-clockwise rotation of feedback arm 167, pin 169 and second feedback arm 171. Simultaneously, link 172 rotates clockwise about fulcrum 173 and drives spring cap 174 upward. The upward movement of cap 174 produces compression of spring 173 and an attendant increase in upward force on spool 152. This action continues until the force produced by feedback spring 175 equals the applied force, at which point the valve spool 152 is at the null position drawn in FIG. 8. This action produces the well knwn characteristic of the force-feedback servomotor i.e.: the equilibrium position of piston 160 and output shaft 151 is proportional to the force applied to spool 152.

In the system of the invention the axial forces that act on spool 152 are: the downward force applied by spring 86, the downward force applied by the pressure difference across piston 153, and the upward force applied by spring 175. Piston 153 operates slidably in bore 176 in body 1. Conduit 177 communicates chamber 178 of bore 176 with conduit 41 and conduits 145 and 146 communicate chamber 179 of bore 176 with chamber 46 of pressure regulator 24 (as shown in FIG. 6). The pressure in conduit 41 is substantially equal to the pressure in conduit 22 through the action of pressure regulator 25. Accordingly, the pressure difference across piston 153 is substantially equal to the pressure drop across the corrected speed sensing flow restriction 23. Chamber 98 communicates with chamber 170 through conduit 187 and therefore the axial forces induced by the pressure acting on the end of spool 152 in chamber 170 and by the pressure acting on the end of rod 104 in chamber 98 are made to cancel by making the diameter of rod 104 equal to the diameter of spool 152.

As now described, the corrected speed servomotor output shaft 151 moves in the downward direction shown in FIG. 8 in response to an increase in the pressure drop across corrected speed sensing restriction 23 and reaches an equilibrium position that is substantially proportional to the square of corrected engine speed. The variation of postion of spool 84 with equilibrium speed produces a small variation in the force applied to spool 152 by spring 86. This force variation has a negligible effect on the equilibrium position of servomotor output shaft 151.

However, when spindle 88 (FIG. 4) is suddenly, incrementally rotated to a new position, as in the case of vehicle acceleration command, the initial downward displacement of spool 84 is large compared to displacement reached at the end of the acceleration. This initial displacement of spool 84 results in a significant increase in the force applied on spool 152 by spring 86 and consequently produces a significant initial displacement of servomotor output shaft 151.

The downward displacement of spool 84 simultaneously increases the area of variable orifice 96 and by the previously described process involving orifices 62, 63 and 77 induces a prescribed increased rate of fuel delivery to the engine, which causes the engine speed to increase. The increase pressure drop across flow restriction 21 that accompanies the engine speed increase, returns spool 84 upward, decreasing the force applied on spool 152 by spring 84; and, the simultaneously increasing pressure drop across flow restriction 23 increases the downward force applied on spool 152 by piston 153. It can be shown that this transient decay and growth of forces substantially cancel. Therefore, in response to a sudden, incremental rotation of spindle 88, the engine power turbine vane is rotated to substantially the final equilibrium value before the engine speed has reached the final equilibrium value. Thus the turbine vane leads engine speed upon acceleration command.

Three-way valve 180, shown in FIG. 8, provides a means for selectively communicating chamber 179 with chamber 46 or with reservoir 10 through conduit 4. Rotation of three-way valve 180 from the normal operating position shown in FIG. 8 to the clockwise 90° position results in a substantial reduction in the pressure in chamber 179, causing a substantial increase in the downward force applied to spool 152. This force being substantially larger than that produced by the pressure drop across restriction 23 at any operating condition, the corrected speed servomotor output shaft 151 is driven downward full stroke. In this full stroke position of shaft 151, arm 13 (FIG. 1) places the turbine vane in the position to reverse the gas flow (relative to blade velocity) to the power turbine. Accordingly, three-way valve 180 can be utilized to provide engine braking.

It will be understood that various changes and modifications may be made to the above-described fuel control without departing from the spirit and scope of the invention as set forth in the claims appended hereto.

What is claimed is:

1. A flow control circuit for feeding fuel to a gas turbine engine, said control circuit comprising:
    (a) an inlet conduit, a discharge conduit and a return conduit, said inlet conduit being connected to a fuel reservoir through a pressurizing means, said discharge conduit being connected to the fuel injection system of said engine, said return conduit being connected to said reservoir;
    (b) a positive displacement pump means, the inlet side of said pump means being connected to said inlet conduit, the discharge side of said pump being connected to a first branch conduit, and drive means operable to drive said pump means at a speed proportional to the rotational speed of said engine;
    (c) a first valve means responsive to the pressure in said first branch conduit and said inlet conduit, being operative to pass flow from said inlet conduit to said return conduit and being operable, in conjunction with said pressurizing means, to automatically hold the pressure in said inlet conduit substantially equal to the pressure in said first branch conduit;
    (d) first and second flow restriction means in series in said first branch conduit;
    (e) a second valve means downstream of said second flow restriction means and being in communication with the pressure in said discharge conduit and the pressure in said first branch conduit, said second valve means being operable to pass flow from said first branch conduit to said return conduit and being operable to automatically hold the pressure downstream of said second flow restriction means at a substantially constant increment above the pressure in said discharge conduit;
    (f) a second branch conduit connected to said inlet conduit and third flow restriction means in said second branch conduit; and,
    (g) third valve means downstream of said third flow restriction means, said third valve means being in communication with the pressure in said first branch conduit between said first and second flow restriction means and with said second branch conduit downstream of said third flow restriction means, and being operable to pass flow from said second branch conduit to said discharge conduit and being further operable to automatically hold the pressure downstream of said third flow restriction means, substantially equal to the pressure downstream of said first flow restriction means.

2. In the circuit of claim 1, said third flow restriction means comprising a first variable orifice and a second variable orifice connected in parallel and a third variable orifice connected in series with said first and said second variable orifices, said variable orifices having area control elements and having;
    (a) a first actuator means that is coupled to the area control element of said first variable orifice, said first actuator means being responsive to the inlet air pressure of said engine and being operable to position said area control element of said first variable orifice to provide reduction of the area of said first variable orifice in response to decrease of engine inlet air pressure;
    (b) a second actuator means that is coupled to the area control element of said second variable orifice, said second actuator means being responsive to the pressure drop across said third flow restriction means and thereby being responsive to engine rotational speed, said second actuator means being operable to position said area control element of said second variable orifice to provide: increasing area of said second variable orifice with increasing engine speed in a low engine speed region, constant area of said second variable orifice in a mid engine speed region, and decreasing area of said second variable orifice with increasing engine speed in a high engine speed region; and, (c) a third actuator means that is coupled to the area control element of said third variable orifice, said third actuator means being responsive to the pressure drop across said third flow restriction means in said second branch conduit and thereby being responsive to engine rotational speed, said third actuator being operable to decrease the area of said third variable orifice with increasing speed of said engine.

3. A fuel control in accordance with claim 2 and having means defining a power control lever, said power control lever being coupled to said third actuator means, said third actuator means being operable to increase the area of said third variable orifice with increasing setting of said power lever and being operable to decrease the area of said third variable orifice with increasing speed of said engine.

4. In the system of claim 2, said second variable orifice being a spool valve, said spool valve comprising:
(a) a spool member, said spool member having a first and a second land, said lands being separated by a central region of smaller diameter and a passage being in said spool member, said passage communicating the end of said first land with said central region;
(b) a sleeve member, said sleeve member having bore mating with said spool member and having an axially aligned rectangular port, said port communicating with the bore of said sleeve and the upstream side of said third variable orifice, the axial length of said axially aligned rectangular port being smaller than the length of said central region of said spool member, and said sleeve member having end walls,
(c) a first and a second spring, said springs coacting between said end walls of said sleeve member and the ends of said spool member; and,
(d) passage means, said passage means comprising passages opening into said bore at said end walls and communicating the end of said first land of said spool member with pressure in said inlet conduit, and communicating the end of said second land of said spool member with the pressure downstream of said third flow restriction means, said spool member being thereby responsive to engine rotational speed and said second variable orifice being thereby operable under varying engine rotational speed to provide an orifice of increasing area with speed in low speed region, constant area in a mid speed region and decreasing area with speed in a high speed region.

5. A fuel control in accordance with claim 1 and having actuator means responsive to the pressure drop across said second flow restriction means in said first branch conduit, said actuator means being operable to alter variable geometric elements of said engine.

6. The actuator means in claim 5 being a hydraulic servomotor of the force feedback type, said servomotor being responsive to the pressure drop across said second flow restriction means in said first branch conduit.

7. A fuel control in accordance with claim 1 and having an actuator means responsive to the pressure downstream of said third flow restriction means in said second branch conduit and to the pressure downstream of said second flow restriction means in said first branch conduit, said actuator means being operable to alter variable geometric elements of said engine.

8. In claim 1 said second flow restriction in said first branch conduit being a variable orifice, said variable orifice being responsive to the temperature of the air entering said engine, whereby the area of said variable orifice is made to increase with said temperature.

9. In claim 1 said first flow restriction means in said first branch conduit being a variable orifice, said variable orifice being responsive to the rotational speed of said engine, the temperature of the air entering said engine and to a mechanical means, whereby said area of said variable orifice is made to increase with engine speed, to increase with said temperature and to increase or decrease with said mechanical means.

10. In claim 1 said first flow restriction in said first branch conduit being a variable orifice, said variable orifice comprising:
(a) a carrier member having: a bore; a pressure responsive, spring-biased piston; said orifice extending through said piston, said piston being urged against said spring bias by the pressure drop across said orifice in said piston;
(b) a metering rod, said rod being axially moveable in said orifice in said piston to form said variable orifice and being operable to decrease the area of said variable orifice upon penetration into said orifice in said piston.
(c) a temperature responsive actuator, said actuator being responsive to temperature of the air entering said engine and being operable to axially displace said metering rod relative to said piston to increase the area of said variable orifice with increase in said air temperature; and,
(d) structural means manually operable to axially displace said carrier member relative to said metering rod.

11. The actuator means of claim 7 being a hydraulic servomotor of the force feed-back type and having: an input rod, said rod being connected to a chambered moveable wall; a first conduit communicating one side of said moveable wall to the downstream side of said third flow restriction means in said second branch conduit; and a second conduit communicating the opposite side of said moveable wall to the downstream side of said second flow restriction means in said first branch conduit.

12. A fuel control comprising the elements of claim 3 and having a force link transmitting force from said third actuator means to said input rod of said servomotor.

13. Claim 11 plus a three-way valve being in said second conduit, said three-way valve being operative to selectively communicate said opposite side of said moveable wall to said downstream side of said second flow restriction means in said first branch conduit or to a lower pressure source.

14. A system in accordance with claim 1, and having an actuator that is responsive to the inlet air temperature of said engine and wherein:
(a) said first flow restriction means in said first branch conduit is a first variable orifice, said orifice having a first area control element;
(b) said second flow restriction means in said first branch conduit is a second variable orifice, said second variable orifice having a second area control element;
(c) said first area control element is connected to a first lever, and said second area control element is connected to a second lever, said levers being mounted perpendicularly on a journaled shaft and being thereby operative to move said area control elements upon rotation of said shaft, and said actuator being operative to rotate said shaft.

(d) said second lever being rigidly coupled to said shaft;

(e) said first lever having a bore mating rotatably with said shaft, and having an arcuate slot segment contiguous with said bore, said shaft lying in said bore and having a perpendicularly projecting pin, said pin nesting in said slot and being operative to allow rotation of said shaft in said bore within the arc length defined by the contact of said pin with the circumferential ends of said slot, said pin being urged against a first circumferential end of said slot by a torsion spring, said spring engaging said shaft and said second lever, said second lever being rotationally locked to said shaft when said pin is made to contact said first circumferential end of said slot; and said shaft being rotatable in said bore through said arc length when said second lever contacts an external stop under rotation of said shaft, said torsion spring being operative to wind and said pin being operative to move in said slot away from said first circumferential end of said slot.

* * * * *